(12) United States Patent
Lai et al.

(10) Patent No.: US 11,930,169 B2
(45) Date of Patent: Mar. 12, 2024

(54) METHOD AND APPARATUS OF CROSS-COMPONENT ADAPTIVE LOOP FILTERING FOR VIDEO CODING

(71) Applicant: MEDIATEK INC., Hsinchu (TW)

(72) Inventors: Chen-Yen Lai, Hsinchu (TW); Ching-Yeh Chen, Hsinchu (TW); Tzu-Der Chuang, Hsinchu (TW)

(73) Assignee: HFI INNOVATION INC., Zhubei (TW)

(*) Notice: Subject to any disclaimer, the term of this patent is extended or adjusted under 35 U.S.C. 154(b) by 257 days.

(21) Appl. No.: 17/619,812

(22) PCT Filed: Jun. 24, 2020

(86) PCT No.: PCT/CN2020/097943
§ 371 (c)(1),
(2) Date: Dec. 16, 2021

(87) PCT Pub. No.: WO2020/259538
PCT Pub. Date: Dec. 30, 2020

(65) Prior Publication Data
US 2022/0303529 A1  Sep. 22, 2022

Related U.S. Application Data

(60) Provisional application No. 62/867,291, filed on Jun. 27, 2019.

(51) Int. Cl.
*H04N 7/12* (2006.01)
*H04N 19/117* (2014.01)
(Continued)

(52) U.S. Cl.
CPC ......... *H04N 19/117* (2014.11); *H04N 19/132* (2014.11); *H04N 19/172* (2014.11); *H04N 19/186* (2014.11); *H04N 19/82* (2014.11)

(58) Field of Classification Search
CPC .. H04N 19/117; H04N 19/132; H04N 19/172; H04N 19/186; H04N 19/82; H04N 19/182; H04N 19/46; H04N 19/86
(Continued)

(56) References Cited

U.S. PATENT DOCUMENTS 9,749,646 B2  8/2017  Zhu et al.
9,807,403 B2  10/2017  Chong et al.
(Continued)

FOREIGN PATENT DOCUMENTS

CN  103891293 A  6/2014
CN  105898335 A  8/2016
(Continued)

OTHER PUBLICATIONS

Extended European Search Report dated Apr. 24, 2023, issued in application No. EP 20833446.6.
(Continued)

*Primary Examiner* — Gims S Philippe
(74) *Attorney, Agent, or Firm* — McClure, Qualey & Rodack, LLP

(57) ABSTRACT

Methods and apparatus for video coding are disclosed. According to one method, First ALF (Adaptive Loop Filter) processing is applied to the reconstructed chroma samples for a target reconstructed chroma sample to generate a first filtered chroma sample. Second ALF processing is applied to the related reconstructed luma samples to generate a second filtered chroma sample for the target reconstructed chroma sample, where positions of the related reconstructed luma samples selected for the second ALF processing are determined according to the target chroma format. According to another method, the luma ALF and the cross-component ALF have the same filter coefficient precision.

7 Claims, 5 Drawing Sheets

(51) Int. Cl.
    *H04N 19/132*      (2014.01)
    *H04N 19/172*      (2014.01)
    *H04N 19/186*      (2014.01)
    *H04N 19/82*      (2014.01)

(58) Field of Classification Search
    USPC .................................................. 375/240.02
    See application file for complete search history.

(56) References Cited

U.S. PATENT DOCUMENTS

| | | | |
|---|---|---|---|
| 10,057,574 | B2 | 8/2018 | Li et al. |
| 10,306,246 | B2 | 5/2019 | Chao et al. |
| 2015/0016551 | A1 | 1/2015 | Esenlik et al. |
| 2018/0063527 | A1* | 3/2018 | Chen .................. H04N 19/117 |
| 2018/0332283 | A1* | 11/2018 | Liu ...................... H04N 19/119 |
| 2019/0306516 | A1* | 10/2019 | Misra .................. H04N 19/593 |
| 2021/0227240 | A1* | 7/2021 | Chen .................. H04N 19/593 |
| 2021/0385500 | A1* | 12/2021 | Zhang .................. H04N 19/11 |
| 2022/0078484 | A1* | 3/2022 | Filippov ................ H04N 19/96 |
| 2022/0248007 | A1* | 8/2022 | Misra .................. H04N 19/186 |

FOREIGN PATENT DOCUMENTS

| | | |
|---|---|---|
| CN | 106028050 A | 10/2016 |
| CN | 107211154 A | 9/2017 |
| CN | 107251557 A | 10/2017 |
| CN | 109600611 A | 4/2019 |

OTHER PUBLICATIONS

Misra, K., et al.; "Cross-Component Adaptive Loop Filter for chroma;" Joint Video Experts Team (JVET) of ITU-T SG 16 WP 3 and ISO/IEC JTC 1/SC 29/WG 11; Jul. 2019; pp. 1-8.

Su, Y-C., et al.; "CE2-related: Reduction of bits for ALF coefficient fractional part;" Joint Video Experts Team (JVET) of ITU-T SG 16 WP 3 and ISO/IEC JTC 1/SC 29/WG 11; Oct. 2018; pp. 1-10.

International Search Report and Written Opinion dated Sep. 15, 2020, issued in application No. PCT/CN2020/097943.

Chinese language office action dated May 20, 2021, issued in application No. TW 109121426.

\* cited by examiner

US 11,930,169 B2

METHOD AND APPARATUS OF CROSS-COMPONENT ADAPTIVE LOOP FILTERING FOR VIDEO CODING

CROSS REFERENCE TO RELATED APPLICATIONS

The present invention claims priority to U.S. Provisional Patent Application, Ser. No. 62/867,291, filed Jun. 27, 2019. The U.S. Provisional Patent Application is hereby incorporated by reference in its entirety.

FIELD OF THE INVENTION

The present invention relates to adaptive loop filter (ALF) processing in a video coding system. In particular, the present invention relates to Cross-Component ALF processing in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing including adaptive loop filter (ALF). For Inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In video coding systems, various in-loop filters such as Deblocking Filter (DF) 130, Sample Adaptive Offset (SAO) 131 and Adaptive Loop Filter (ALF) 132 have been used to enhance picture quality.

A corresponding decoder for the encoder of FIG. 1A is shown in FIG. 1B. The video bitstream is decoded by Entropy Decoder 142 to recover the transformed and quantized residues. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Cross-Component ALF Processing

In JVET-O0636 (Kiran Misra, et al., "Cross-Component Adaptive Loop Filter for chroma", Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O0636), Cross-Component Adaptive Loop Filter (CC-ALF) is proposed. CC-ALF makes use of luma sample values to refine each chroma component. FIG. 2A illustrates the structure of CC-ALF with respect to the other loop filters according to JVET-O0636. In FIG. 2A, the ALF processing is performed after respective SAO (210, 212 and 214). In a conventional video coding system, only ALF Luma 220 and ALF Chroma 230 are used. In JVET-O0636, two additional ALF filters, i.e., CC ALF Cb 222 and CC ALF Cr 224 are used to derive adjustment signals to add to ALF processed Cb and Cr using adders 240 and 242 respectively.

In CC-ALF operates by applying a linear, diamond shaped filter to the luma channel for each chroma component as shown in FIG. 2B according to JVET-O0636. The filter coefficients are transmitted in the APS, scaled by a factor of $2^{10}$, and rounded for fixed point representation. The application of the filters is controlled on a variable block size and signalled by a context-coded flag received for each block of samples. The block size along with a CC-ALF enabling flag is received at the slice-level for each chroma component. Syntax and semantics for CC-ALF are also disclosed in JVET-O0636.

Adaptive Colour Transform

Most screen contents are captured in the RGB colour space. For an image block in RGB colour space, usually there can be strong correlation among different colour components such that a colour space conversion is useful for removing inter-colour component redundancy. However, for screen content, there may exist many image blocks containing different features having very saturated colours, which leads to less correlation among colour components. For those blocks, coding directly in the RGB colour space may be more effective. To handle different characteristics of image blocks in screen contents, an RGB-to-YCoCg conversion as shown in the following equation has been studied and it turned out to be effective.

$$\begin{bmatrix} Y \\ C_o \\ C_g \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

When this colour transform is used, both the input image block and its corresponding prediction use the same conversion. Because the conversion is linear, it is identical to having the transform applied to residuals in the spatial domain when the prediction processes in different colour components are consistent. Thus, in HEVC-SCC (HEVC Screen Content Coding), the conversion is applied on the residual, which makes the prediction process for different colour components independent. It is also noted for intra-coded blocks, when the intra prediction directions for different colour components are not the same, the colour transform is not allowed to be used. This limitation is specified because when the intra prediction directions are different, the correlation among collocated samples across colour components is decreased, making the colour transform less effective. The colour transform also changes the norm of different components. To normalize the errors in different colour spaces, when the above transform is used for an image block, a set of QP (Quantization Parameter) offsets (−5, −5, −3) is applied to those three colour component— during quantization. After the quantization and reconstruction, an inverse transform is applied to the quantized residual so that the reconstruction is still kept in the input colour space.

In this application, some issues related CC ALF are addressed.

BRIEF SUMMARY OF THE INVENTION

A method and apparatus for video coding are disclosed. According to this method, reconstructed chroma samples and related reconstructed luma samples in a colour picture with a target chroma format are received. First ALF (Adaptive Loop Filter) processing is applied to the reconstructed chroma samples for a target reconstructed chroma sample to generate a first filtered chroma sample. Second ALF processing is applied to the related reconstructed luma samples to generate a second filtered chroma sample for the target reconstructed chroma sample, wherein positions of the related reconstructed luma samples selected for the second ALF processing are determined according to the target chroma format. A final filtered chroma sample is generated by combining the first filtered chroma sample and the second filtered chroma sample, wherein the final filtered chroma sample is used as a video decoding output or used for further video encoding or decoding process.

If the target chroma format corresponds to YUV444/YCrCb444, one of the related reconstructed luma samples selected for the second ALF processing is at a same position as the target reconstructed chroma sample. If the target chroma format corresponds to YUV422/YCrCb422 or YUV420/YCrCb420, one of the related reconstructed luma samples selected for the second ALF processing is at a pre-defined spatial position among multiple reconstructed luma samples associated with the target reconstructed chroma sample.

In one embodiment, the positions of the related reconstructed luma samples selected for the second ALF processing are determined according to a calculation with one or more variables derived based on the target chroma format. For example, the calculation comprises a first term corresponding to x-position of the target reconstructed chroma sample scaled by an x-subsampling factor and a second term corresponding to y-position of the target reconstructed chroma sample scaled by a y-subsampling factor. The x-subsampling factor can be equal to 1 for monochrome and YUV444/YCrCb444, and the x-subsampling factor can be equal to 2 for YUV420/YCrCb420 and YUV422/YCrCb422. The y-sub sampling factor can be equal to 1 for the monochrome, the YUV422/YCrCb422 and the YUV444/YCrCb444, and the y-subsampling factor can be equal to 2 for the YUV420/YCrCb420.

In one embodiment, one target related reconstructed luma sample selected for the second ALF processing corresponds to a weighted sum of all corresponding related reconstructed luma samples related to one target reconstructed chroma sample.

According to another method, reconstructed chroma samples and related reconstructed luma samples in a colour picture with a target chroma format are received. First ALF processing is applied to the related reconstructed luma samples to generate a first filtered chroma sample for a target reconstructed chroma sample, where the first filtered chroma sample is combined with a second filtered chroma sample to form a final filtered chroma sample, and the second filtered chroma sample is derived by applying second ALF processing to the reconstructed chroma samples. Third ALF processing is applied to the related reconstructed luma samples to generate a filtered luma sample, where the first ALF processing and the third ALF processing have a same filter coefficient precision. The final filtered chroma sample and the filtered luma sample are used as a video decoding output or used for further video encoding or decoding process.

DETAILED DESCRIPTION OF THE INVENTION

Figure 1A:
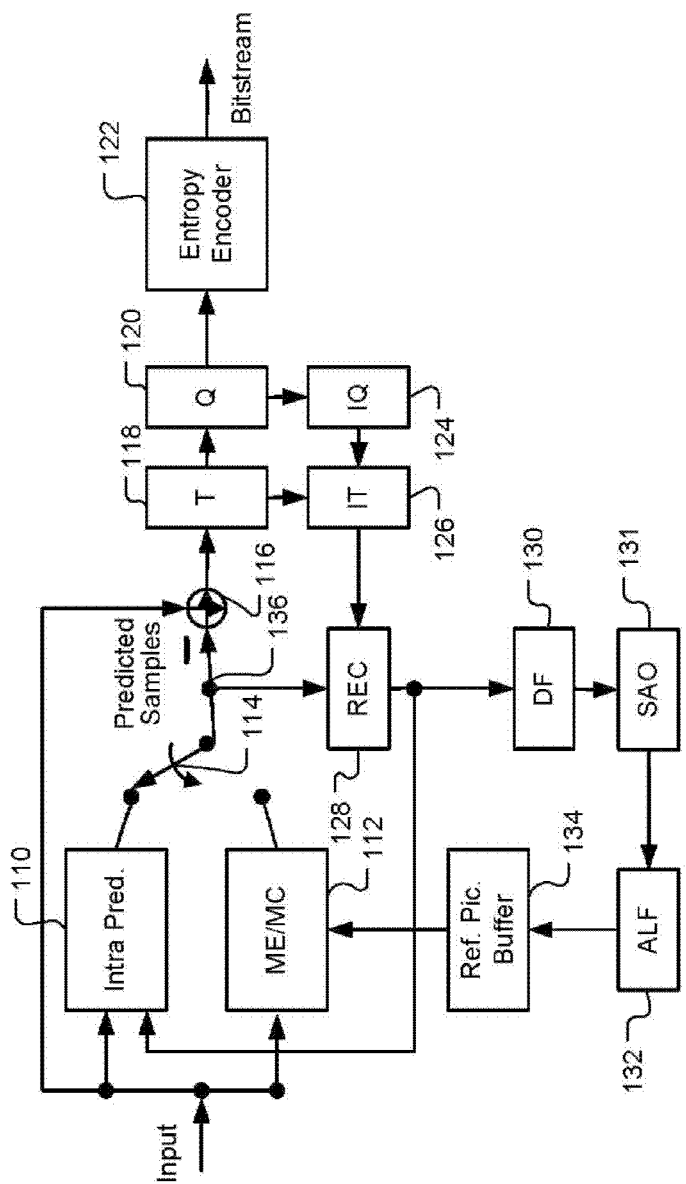
FIG. 1A illustrates an exemplary adaptive inter/intra video encoding system incorporating DF, SAO and ALF in-loop processing.
Figure 1B:
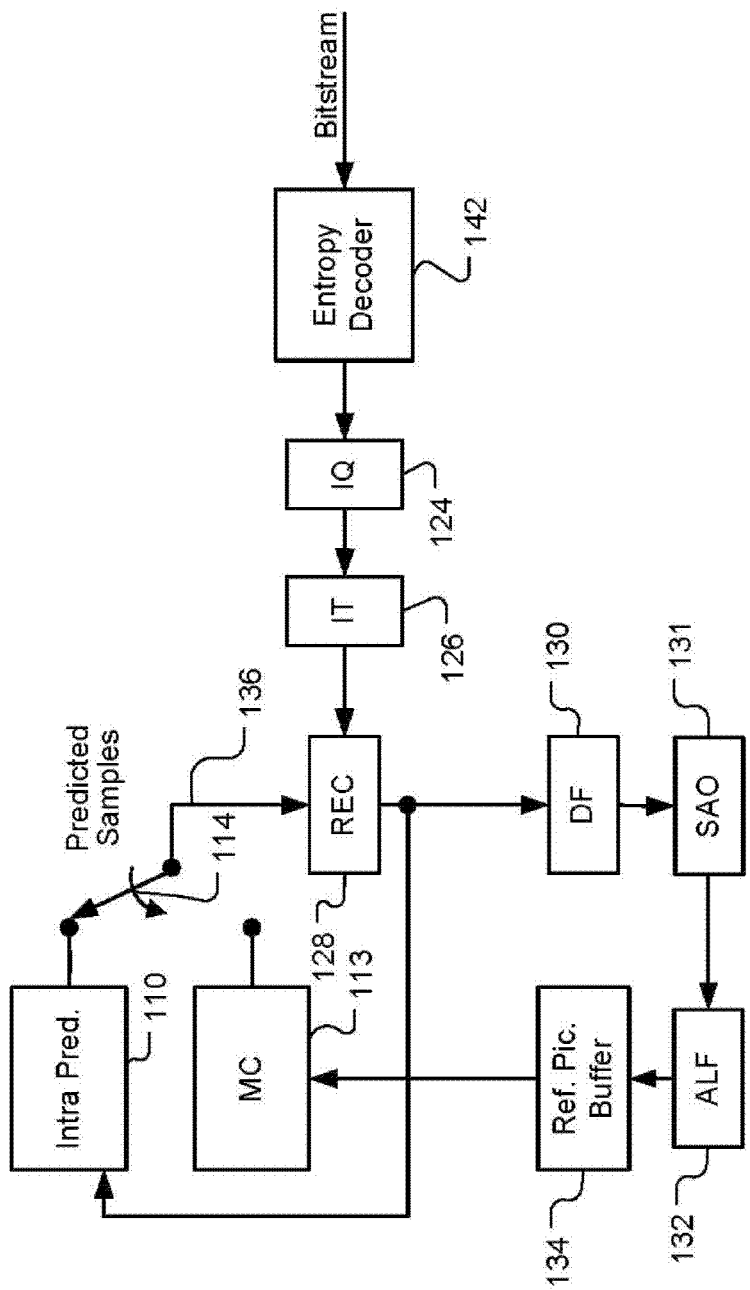
FIG. 1B illustrates an exemplary adaptive inter/intra video decoding system incorporating DF, SAO and ALF in-loop processing.
Figure 2A:
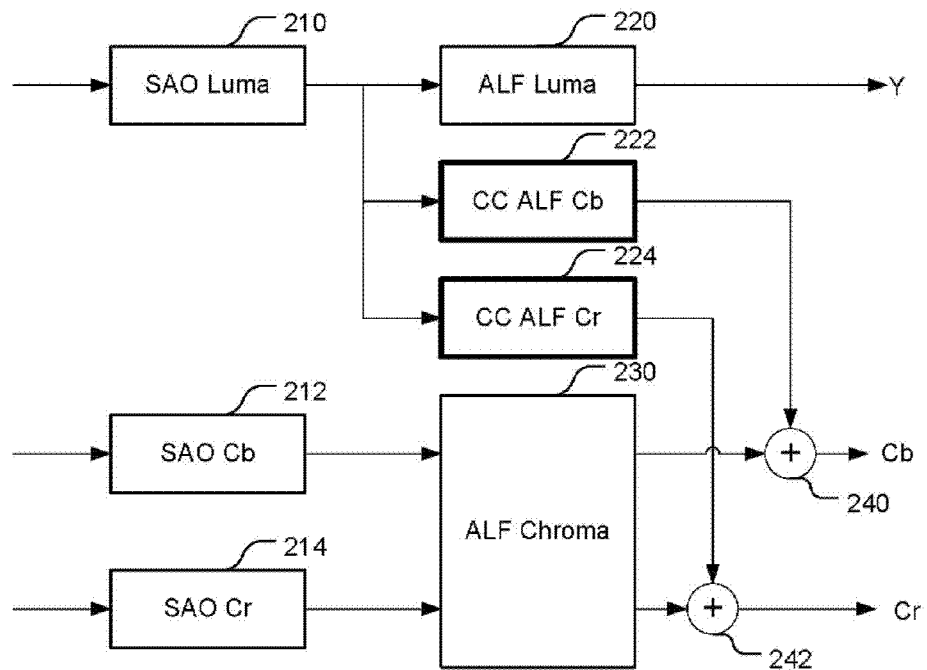
FIG. 2A illustrates the structure of CC-ALF with respect to the other loop filters according to JVET-O0636.
Figure 2B:
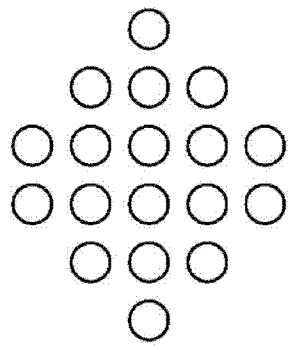
FIG. 2B illustrates a diamond shaped filter applied to the luma channel to derive a cross-colour filtered chroma component.

The following description is of the best-contemplated mode of carrying out the invention. This description is made for the purpose of illustrating the general principles of the invention and should not be taken in a limiting sense. The scope of the invention is best determined by reference to the appended claims.

Simplified CC-ALF as Multiple Inputs ALF

In CC-ALF, one additional filter is added for chroma component and the filtered output will be the weighted sum of the original chroma filter and the additional filter. In one embodiment, only one additional filter tap with the input from the corresponding luma sample is added to the original chroma filter. In another embodiment, non-linear clipping operation can be also applied to this filter tap. That is, the clipping index can be signaled for this filter tap. In another embodiment, non-linear clipping operation cannot be applied to this filter tap, i.e. the clipping index cannot be signaled for this filter tap. In another embodiment, one flag is signalled in ALF filter parameters to indicate whether this filter tap is used or not.

Luma Samples for CC ALF According to the Chroma Format

In one embodiment, a corresponding luma sample for CC ALF can be decided according to the chroma format. Since there may not be one-to-one correspondence the luma samples and chroma samples for a target chroma format, selection of corresponding luma samples for CC ALF processing of a to-be-processed chroma sample is important to achieve good CC ALF performance. For example, if the video format is YUV444 (or YCrCb444), then the corresponding luma sample is located at the same spatial position of to-be-processed chroma sample. If the video format is YUV422 (or YCrCb422) or YUV420 (or YCrCb420), then the corresponding luma sample can be a predefined spatial position among the corresponding luma samples of to-be-processed chroma sample. For example, for YUV420 (or YCrCb420), there are four corresponding luma samples for one chroma sample. The input of the additional filter tap from luma component for chroma component can be one of these four luma samples. Similarly, the corresponding luma sample for the CC ALF processing at a to-be-processed chroma sample can be one of these four luma samples. The selection can be predefined in the video coding standard. For example, the luma sample used for the CC-ALF at location (xL, yL) corresponding to the current chroma sample at chroma location (xCtbC+x, yCtbC+y) can be derived according to the chroma location and the subsampling factor in the x and y directions. For example, the luma sample location can be derived as ((xCtbC+x)×SubWidthC, (yCtbC+y)×SubHeightC), where SubWidthC corresponds to the x-subsampling factor and SubHeightC corresponds to the y-sub sampling factor.

The x-subsampling factor and y-subsampling factor are shown in Table 1 for various chroma formats.

TABLE 1

| Chroma format | SubWidthC | SubHeightC |
|---|---|---|
| Monochrome | 1 | 1 |
| 4:2:0 | 2 | 2 |
| 4:2:2 | 2 | 1 |
| 4:4:4 | 1 | 1 |

In another embodiment, the corresponding luma sample is the weighted sum of all corresponding luma samples. For example, the corresponding luma sample for the CC ALF processing at a to-be-processed chroma sample can be the average value of these four luma samples for YUV420 (or YCrCb420), the average value of the two left luma samples for YUV420 (or YCrCb420), or the average value of the two luma samples for YUV422 (or YCrCb422).

ALF Precision

In another embodiment, the precision of filter coefficients in the additional filter in CC-ALF is aligned with the original design. For example, the CC ALF precision can be aligned with the original ALF.

Cross-Component: Chroma Samples for Luma ALF

In another embodiment, the proposed method is applied to luma ALF. For example, two additional filter taps with the input from chroma for luma ALF are added. In one embodiment, only one additional filter tap is added for luma ALF and the input of the additional filter tap is the weighted sum of chroma components.

Cross-Component Control

In another embodiment, CC-ALF can be only applied when dual tree is disabled. In another embodiment, CC-ALF can be only applied when ACT is disabled.

Cross-Component SAO

In another embodiment, the concept of CC-ALF can also be applied to SAO. The classification for chroma SAO type can refer luma samples to do the decision.

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 3:
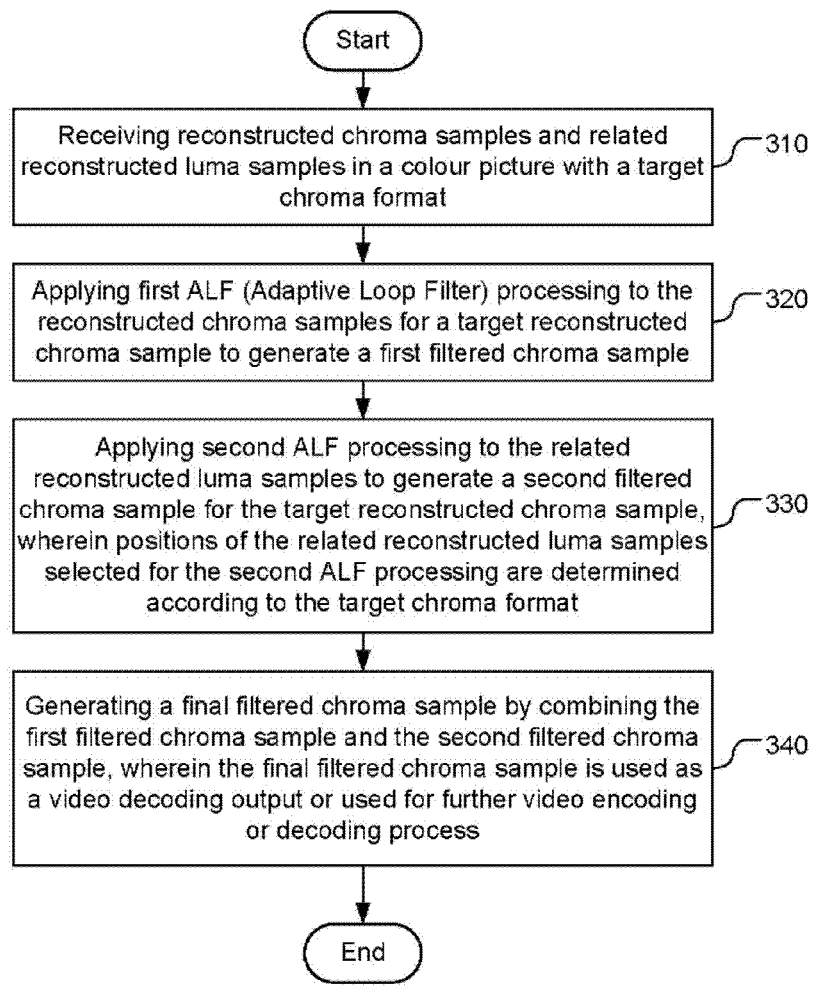
FIG. 3 illustrates a flowchart of an exemplary video coding according to an embodiment of the present invention, where luma samples for the Cross-Component ALF processing are determined according to the chroma format.

FIG. 3 illustrates a flowchart of an exemplary video coding according to an embodiment of the present invention, where luma samples for the Cross-Component ALF processing are determined according to the chroma format. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed chroma samples and related reconstructed luma samples in a colour picture with a target chroma format are received in step 310. First ALF (Adaptive Loop Filter) processing is applied to the reconstructed chroma samples for a target reconstructed chroma sample to generate a first filtered chroma sample in step 320. Second ALF processing is applied to the related reconstructed luma samples to generate a second filtered chroma sample for the target reconstructed chroma sample in step 330, wherein positions of the related reconstructed luma samples selected for the second ALF processing are determined according to the target chroma format. A final filtered chroma sample is generated by combining the first filtered chroma sample and the second filtered chroma sample in step 340, wherein the final filtered chroma sample is used as a video decoding output or used for further video encoding or decoding process.

Figure 4:
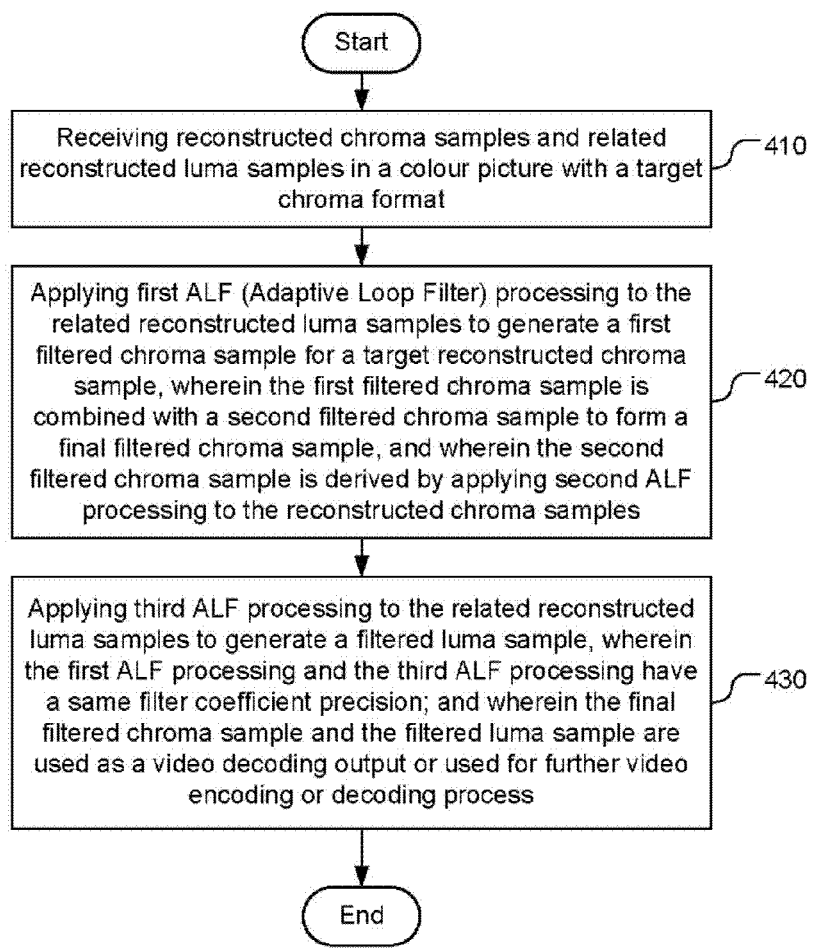
FIG. 4 illustrates a flowchart of an exemplary video coding according to an embodiment of the present invention, where luma ALF and the Cross-Component ALF have the same filter coefficient precision.

FIG. 4 illustrates a flowchart of an exemplary video coding according to an embodiment of the present invention, where luma ALF and the Cross-Component ALF have the same filter coefficient precision. According to this method, reconstructed chroma samples and related reconstructed luma samples in a colour picture with a target chroma format are received in step 410. First ALF (Adaptive Loop Filter) processing is applied to the related reconstructed luma samples to generate a first filtered chroma sample for a target reconstructed chroma sample in step 420, wherein the first filtered chroma sample is combined with a second filtered chroma sample to form a final filtered chroma sample, and wherein the second filtered chroma sample is derived by applying second ALF processing to the reconstructed chroma samples. Third ALF processing is applied to the related reconstructed luma samples to generate a filtered luma sample in step 430, wherein the first ALF processing and the third ALF processing have a same filter coefficient precision and wherein the final filtered chroma sample and the filtered luma sample are used as a video decoding output or used for further video encoding or decoding process.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, the method comprising:
receiving reconstructed chroma samples and related reconstructed luma samples in a colour picture with a target chroma format;
applying first ALF (Adaptive Loop Filter) processing to the reconstructed chroma samples for a target reconstructed chroma sample to generate a first filtered chroma sample;
applying second ALF processing to the related reconstructed luma samples to generate a second filtered chroma sample for the target reconstructed chroma sample, wherein positions of the related reconstructed luma samples selected for the second ALF processing are determined based on the target chroma format; and
generating a final filtered chroma sample by combining the first filtered chroma sample and the second filtered chroma sample, wherein the final filtered chroma sample is used as a video decoding output or used for further video encoding or decoding process,
wherein the positions of the related reconstructed luma samples selected for the second ALF processing are determined according to a calculation with one or more variables derived based on the target chroma format.

2. The method of claim 1, wherein if the target chroma format corresponds to YUV444/YCrCb444, a target position of the related reconstructed luma samples selected for the second ALF processing is at a same position as the target reconstructed chroma sample.

3. The method of claim 1, wherein if the target chroma format corresponds to YUV422/YCrCb422 or YUV420/YCrCb420, a target position of the related reconstructed luma samples selected for the second ALF processing is at a pre-defined spatial position among multiple reconstructed luma samples associated with the target reconstructed chroma sample.

4. The method of claim 1, wherein the calculation comprises a first term corresponding to x-position of the target reconstructed chroma sample scaled by an x-subsampling factor and a second term corresponding to y-position of the target reconstructed chroma sample scaled by a y-subsampling factor.

5. The method of claim 4, wherein the x-subsampling factor is equal to 1 for monochrome and YUV444/YCrCb444, and the x-subsampling factor is equal to 2 for YUV420/YCrCb420 and YUV422/YCrCb422; and wherein the y-subsampling factor is equal to 1 for the monochrome, the YUV422/YCrCb422 and the YUV444/YCrCb444, and the y-subsampling factor is equal to 2 for the YUV420/YCrCb420.

6. The method of claim 1, wherein one target related reconstructed luma sample selected for the second ALF processing corresponds to a weighted sum of all corresponding related reconstructed luma samples related to one target reconstructed chroma sample.

7. An apparatus for video coding, the apparatus comprising one or more electronic circuits or processors arranged to:
receive reconstructed chroma samples and related reconstructed luma samples in a colour picture with a target chroma format;

apply first ALF (Adaptive Loop Filter) processing to the reconstructed chroma samples for a target reconstructed chroma sample to generate a first filtered chroma sample;

apply second ALF processing to the related reconstructed luma samples to generate a second filtered chroma sample for the target reconstructed chroma sample, wherein positions of the related reconstructed luma samples selected for the second ALF processing are determined according to the target chroma format; and generate a final filtered chroma sample by combining the first filtered chroma sample and the second filtered chroma sample, wherein the final filtered chroma sample is used as a video decoding output or used for further video encoding or decoding process, wherein the positions of the related reconstructed luma samples selected for the second ALF processing are determined according to a calculation with one or more variables derived based on the target chroma format.

* * * * *